United States Patent
Chen

(10) Patent No.: US 8,028,308 B2
(45) Date of Patent: Sep. 27, 2011

(54) OPTICAL DISK TRANSPORT DEVICE FOR OPTICAL DISK PLAYER

(75) Inventor: Yung Ta Chen, Guangdong (CN)

(73) Assignee: Valley Wood Electrical (Shenzhen) Co., Ltd., Shenzhen, Guangdong (CN)

( * ) Notice: Subject to any disclaimer, the term of this patent is extended or adjusted under 35 U.S.C. 154(b) by 530 days.

(21) Appl. No.: 12/198,928

(22) Filed: Aug. 27, 2008

(65) Prior Publication Data

US 2009/0276798 A1 Nov. 5, 2009

(30) Foreign Application Priority Data

Apr. 1, 2008 (CN) .......................... 2008 1 0065125

(51) Int. Cl.
*G11B 17/04* (2006.01)
(52) U.S. Cl. ..................................................... 720/625
(58) Field of Classification Search .................. 720/619, 720/624, 625, 621
See application file for complete search history.

(56) References Cited

U.S. PATENT DOCUMENTS

| | | | | |
|---|---|---|---|---|
| 5,467,334 A * | 11/1995 | Kim | ............................... | 720/625 |
| 5,719,844 A * | 2/1998 | Abe | ............................... | 720/625 |
| 6,751,180 B2 * | 6/2004 | Tanaka et al. | ................. | 720/623 |
| 6,968,560 B2 * | 11/2005 | Inoue et al. | .................... | 720/625 |
| 7,665,099 B2 * | 2/2010 | Peng et al. | ..................... | 720/625 |
| 7,685,612 B2 * | 3/2010 | Yoshida et al. | ............... | 720/625 |
| 2005/0091676 A1 * | 4/2005 | Kasama et al. | ............... | 720/625 |
| 2009/0276798 A1 * | 11/2009 | Chen | ............................. | 720/621 |

* cited by examiner

*Primary Examiner* — Brian Miller
(74) *Attorney, Agent, or Firm* — Jackson IPG PLLC; Demian K. Jackson

(57) ABSTRACT

An optical disk transport device for an optical disk player includes a carrying roller, an optical disk guiding part located above the carrying roller, an elastic part for pressing the carrying roller towards the optical disk guiding part, and a motor for driving the carrying roller to rotate. The roll body of the carrying roller is of a bipyramidal structure with the diameter gradually decreasing from the two ends to the middle. The positions on the optical disk guiding part opposite to each pyramid of the carrying roller are provided with at least one rotatable driven roller. The ends adjacent to the middle of the carrying roller of each driven roller slant upwards, so as to make the driven rollers only contact the outer margin of the optical disk when the optical disk is inserted.

20 Claims, 3 Drawing Sheets

OPTICAL DISK TRANSPORT DEVICE FOR OPTICAL DISK PLAYER

BACKGROUND OF THE INVENTION

1. Field of the Invention

The present invention relates to an optical disk transport device in an optical disk playing device, especially relates to an optical disk transport device which transports an optical disk from the insertion inlet to the playing position by the rotating of a carrying roller when the optical disk is inserted from between the carrying roller and the optical disk guiding part.

2. Description of the Related Art

When an optical disk is inserted from between the carrying roller and the guiding part, the transport device that transports the optical disk from the insertion inlet to the playing position by the rotating of a carrying roller is well known. Such as the Japanese patent application with the publication number of 2005-332461, it disclosed an optical transport device composed of a carrying roller of bipyramidal structure, a guiding part, an elastic part to press the carrying roller towards the guiding part, and a motor to drive the carrying roller to rotate. It holds the optical disk between the carrying roller and the guiding part, and by controlling the carrying roller to rotate clockwise or counter clockwise, with the action of the friction of the carrying roller, it transports the optical disk from the insertion inlet to the optical disk plummer (or hub) or transports the optical disk from the optical disk plummer to the insertion inlet.

In the above mentioned optical transport device, for the optical disk is held between the carrying roller of bipyramidal structure and the guiding part, in the transporting process, scratches could occur on the disk surface contacting the guiding part, so it can not be used to the optical disk playing device using the optical disks with the both surfaces being recording surfaces.

SUMMARY OF THE INVENTION

The present invention is to solve the technical problem of providing an optical disk transport device for transporting the optical disk from the insertion inlet to the playing position (namely the optical disk plummer or hub) or from the playing position to the insertion inlet. The optical disk transport device can protect the front and back surfaces of the optical disk from being scratched, and can implement the miniaturization of the optical disk playing device.

To obtain above mentioned object, the present invention of optical disk transport device for optical disk player comprises:

an optical disk guiding part;

a carrying roller being located below the optical disk guiding part, its roll body being a bipyramidal structure formed by two pyramids of the carrying roller, and the bipyramidal structure with the diameter gradually decreasing from the two ends to the middle;

two groups of driven rollers being rotationally fixed to the optical disk guiding part and separately corresponding to the two pyramids of the carrying roller, the rotating axis of each group of driven rollers being located parallel to the rotating axis of the carrying roller which is vertically spaced from the cover of the optical disk playing device, the ends adjacent to the middle of the carrying roller of each driven roller slanting upwards, so as to make the driven rollers only contact the outer margin of the optical disk when the optical disk is inserted;

an elastic part for pressing the carrying roller towards the optical disk guiding part; and a motor for driving the carrying roller to rotate;

while inserting or rejecting an optical disk, the optical disk guiding part making the optical disk to be inserted between the driven rollers and the carrying roller, the carrying roller with the action of the elastic force of the elastic part holding the optical disk between the carrying roller and the driven rollers, only the outer margin of the upper surface of the optical disk contacting the driven rollers, also only the outer margin of the lower surface of the optical disk contacting the pyramids of the carrying roller, the carrying roller and the two groups of driven rollers rotating by the motor's driving to implement transporting the optical disk.

For the positions on the optical disk guiding part opposite to the two pyramids of the carrying roller are separately provided with driven rollers, during the process of transporting the optical disk, the driven rollers contacts the outer margin of the optical disk to rotate towards the direction opposite to the rotating direction of the carrying roller. So, via the rotating of the driven rollers, the upper surface of the optical disk can be protected from being scratched. On the other hand, because the ends adjacent to the middle of the carrying roller of all the driven rollers all slant upwards, and the carrying roller adopted is of bipyramidal structure, so only the outer margin of the upper surface of the optical disk contacts the external circumference of the driven rollers, and also only the outer margin of the lower surface of the optical disk contacts the pyramids of the carrying roller, so as to further more ensure that during the process of transporting optical disks both the front and back surfaces of the optical disk would not be scratched. The optical disk transport device is especially suitable for the optical disk playing device using the optical disks with the both surfaces being recording surfaces.

As compared with the prior optical disk transport device in which the carrying roller and driven rollers all adopt a bipyramidal roller, in the present optical disk transport device, the positions opposite to each pyramid of the carrying roller are all provided with at least one driven roller. The axis length of each driven roller can be made less than half the axis length of the carrying roller, and multiple driven rollers can disperse the elastic force of the elastic part. So while keeping the elastic force of the elastic part changeless, the diameter of the driven rollers can be made much smaller to implement the miniaturization of the playing device.

At the same time, for the elastic force endured by each driven roller becomes smaller, the main parts and short axes at the two ends of the main pars of the driven rollers can adopt a whole piece made of synthetic resin. Comparing with driven rollers adopting metal axis bar as rotating axis, it will reduce the production cost.

DESCRIPTION OF THE PREFERRED EMBODIMENTS

In the present invention, a carrying roller of bipyramidal structure is adopted. The diameter of the roll body of the carrying roller gradually decreases from the two ends towards the middle. The positions opposite to each pyramid of the carrying roller are both provided with driven rollers contacting the external circumference of the optical disk, and the driven rollers are ensured to be capable of rotating freely. Aspects of the present invention are best understood from the following detailed description when read with reference to the accompanying figures.

Figure 1:
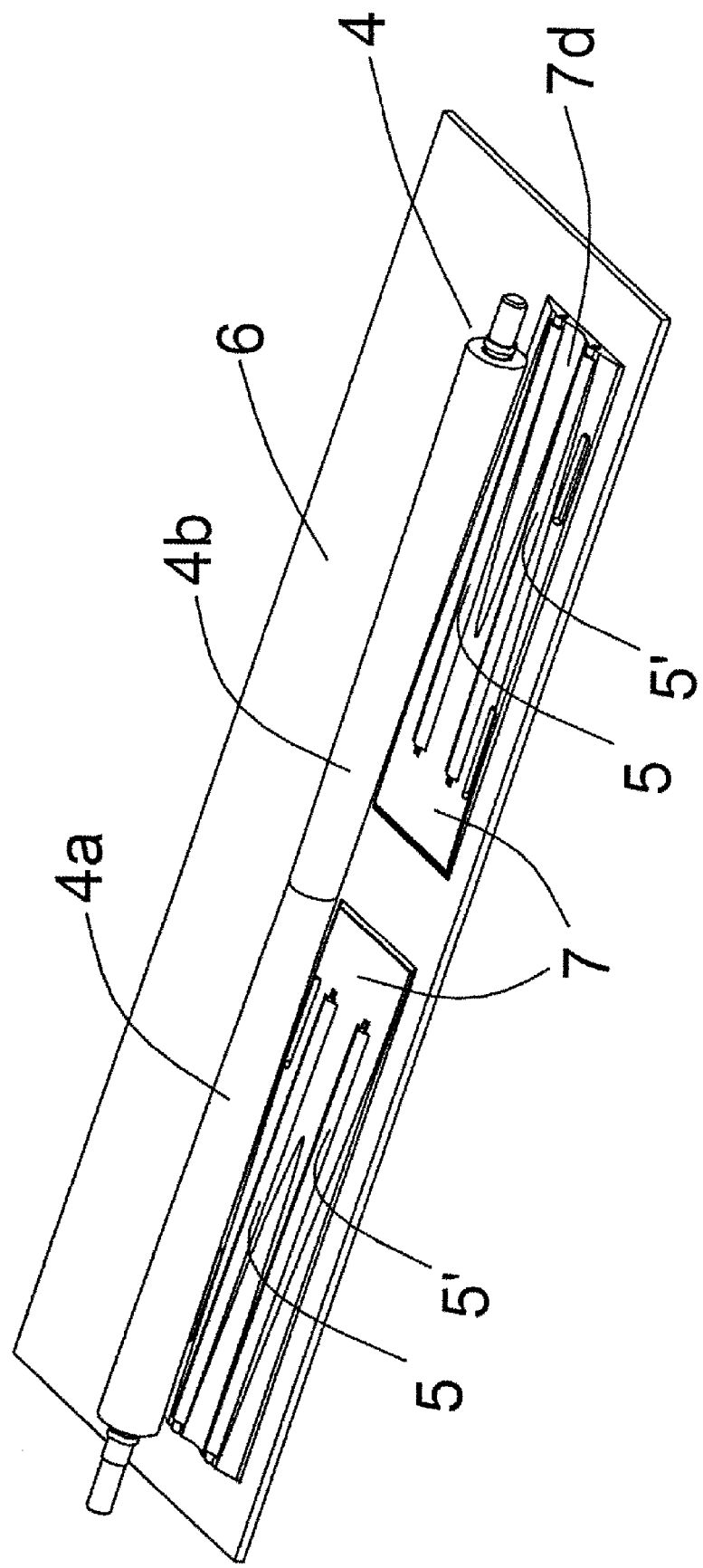
FIG. 1 is a structure schematic diagram of a preferred embodiment of the optical disk transport device of the present invention, illustrating the structure of observing from the bottom to the top.
Figure 2:
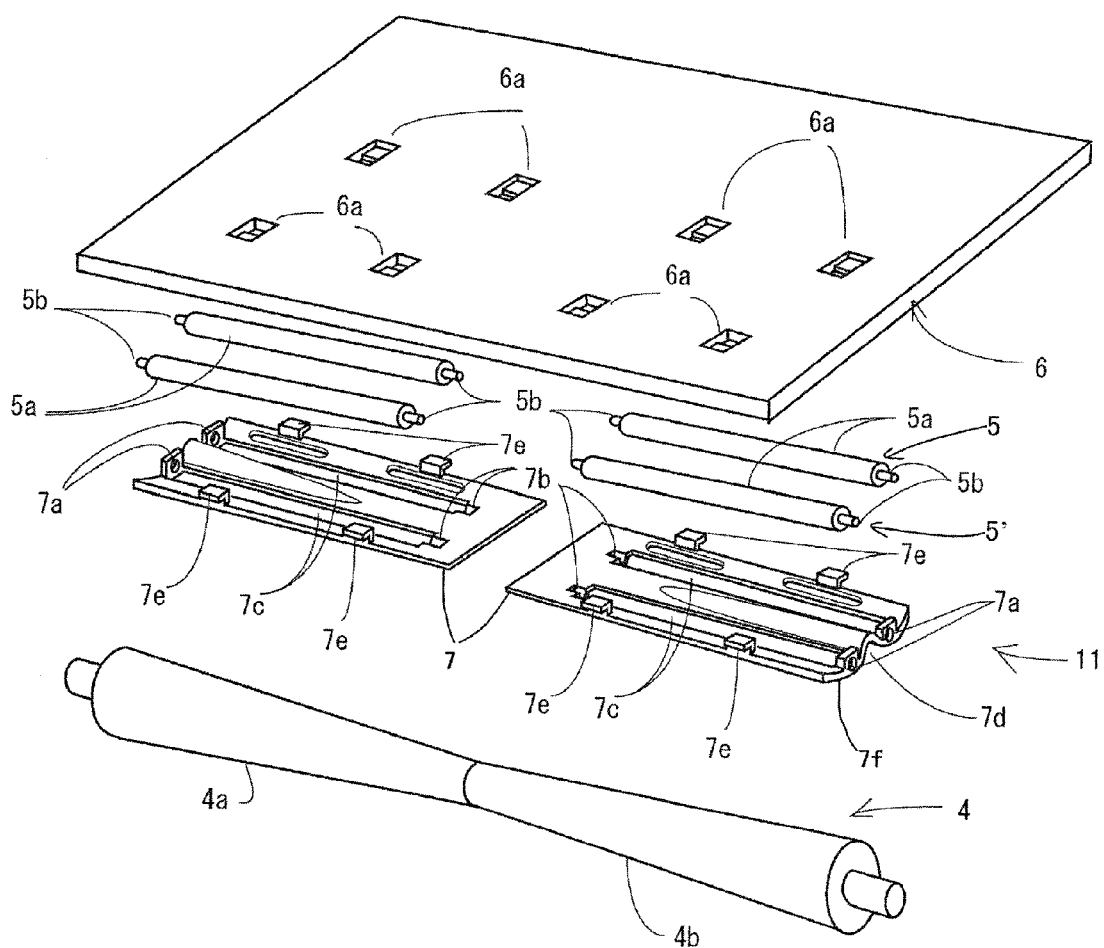
FIG. 2 is an exploded schematic diagram of the optical disk transport device of the present invention.
Figure 3:
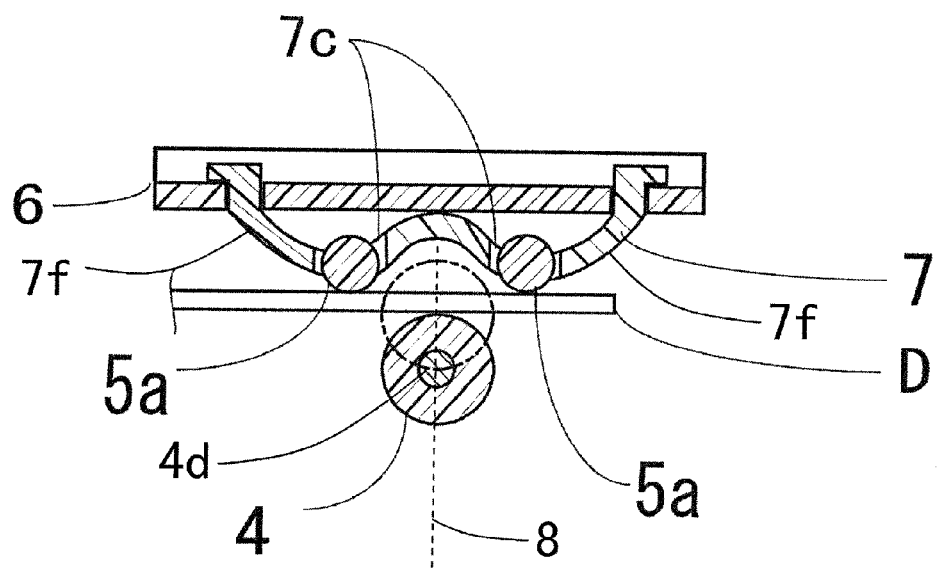
FIG. 3 is a sectional schematic diagram of the optical disk transport device holding the optical disk D.
Figure 4:
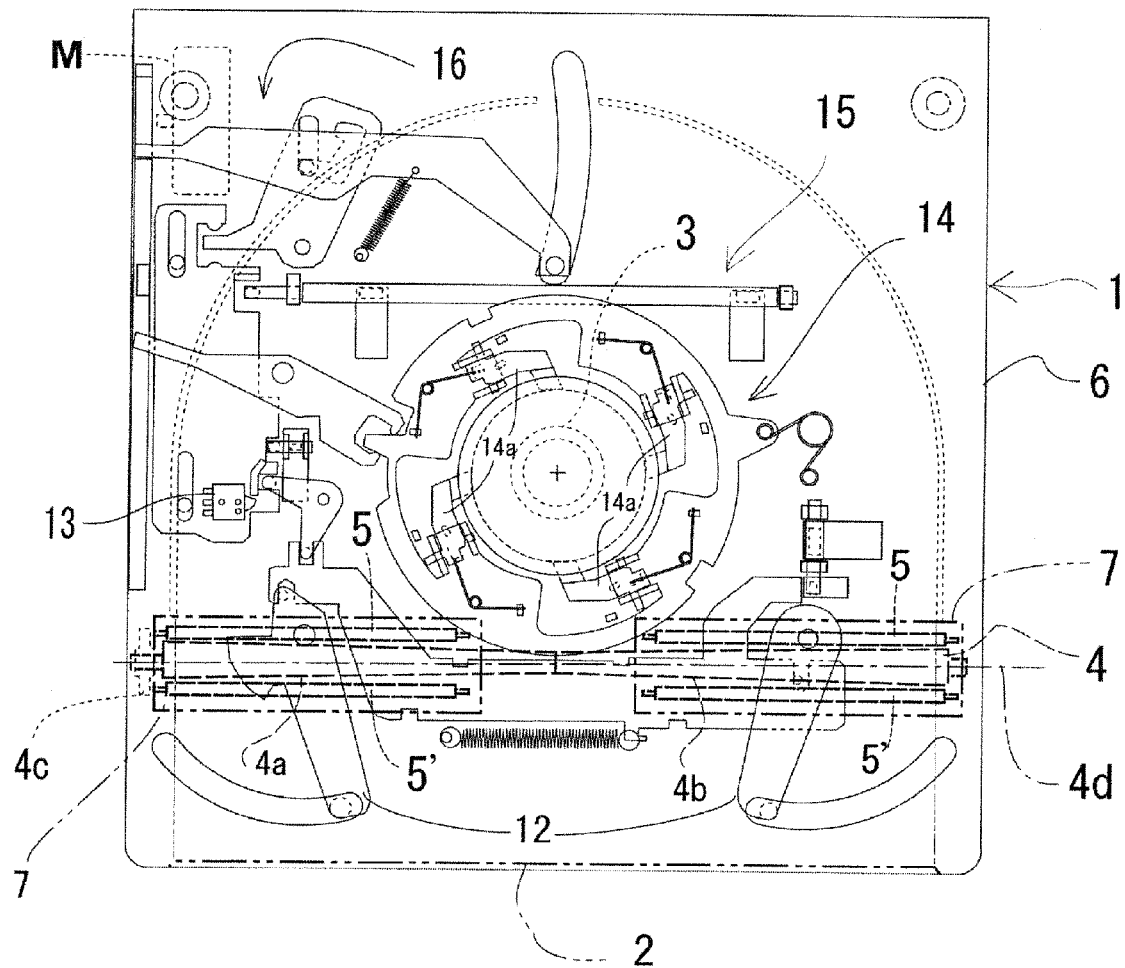
FIG. 4 is a top view schematic diagram of an optical disk playing device provided with the optical disk transport device of FIG. 1.
Figure 5:
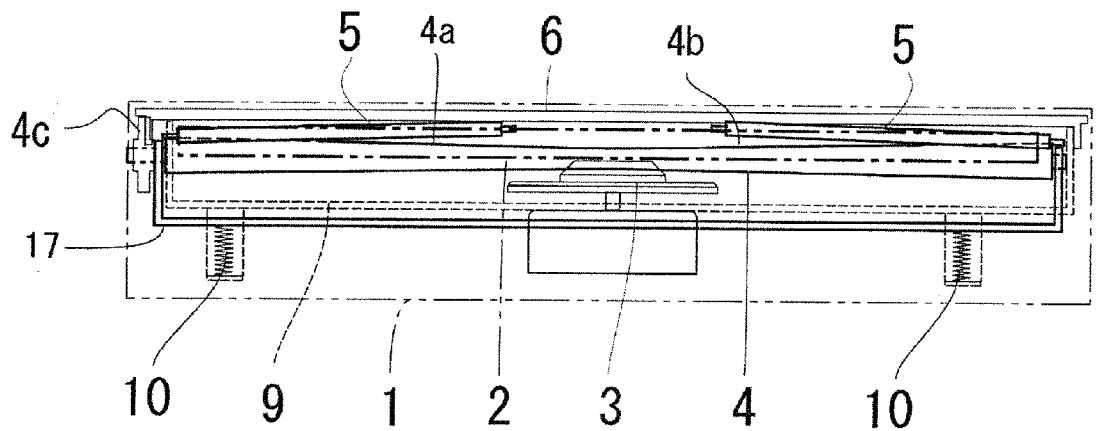
FIG. 5 is a front view schematic diagram of an optical disk playing device provided with the optical disk transport device of FIG. 1.

Referring to FIG. 1-FIG. 3, the optical disk transport device comprises a carrying roller 4, an optical disk guiding part 11 located above the carrying roller 4, two springs 10 (as shown in FIG. 5) for pressing the carrying roller 4 towards the optical disk guiding part 11, and a motor M (as shown in FIG. 4) for driving the carrying roller 4 to rotate. The roll body of the carrying roller 4 is of a bipyramidal structure with the diameter gradually decreasing from the two ends to the middle. The positions on the optical disk guiding part 11 opposite to each pyramid of the carrying roller 4 are both provided with two rotatable driven rollers 5, 5'. The rotating axes of the two driven rollers 5, 5' opposite to each pyramid of the carrying roller 4 are parallel to each other and are distributed at the two sides of the plane 8 (as shown in FIG. 3) and the rotating axis 4d of the carrying roller 4 and is vertically spaced from the cover 6 of the optical disk playing device. The rotating axes of every driven roller 5, 5' are also parallel to the plane 8. And the ends adjacent to the middle of the carrying roller 4 of every driven roller 5, 5' slant upwards, so as to make the driven rollers 5, 5' only contact the external circumference of the optical disk when the optical disk is inserted.

In the present embodiment, the optical disk guiding part 11 comprises two guiding plates 7, and each guiding plate 7 is provided with four claws 7e. The cover 6 is correspondingly provided with eight claw holes 6a, and the two guiding plates 7 via the claws 7e thereof are fixed below the cover 6 of the optical disk playing device, and are separately corresponding to the two pyramids 4a, 4b of the carrying roller 4. The middle of each guiding plate 7 is provided with a groove 7d to contain the pyramid of the carrying roller 4, and the two sides of the guiding plates 7 slant towards the direction of the cover 6 to form an optical disk guiding surface 7f. The optical disk guiding surface 7f of the guiding plate 7 may be a circular-arc guiding surface or an inclined plane.

Two pairs of roller bearings 7a and 7b are provided on each guiding plate 7, and a long hole 7c is provided between each pair of roller bearings 7a and 7b. Each pair of roller bearings 7a and 7b supports a driven roller 5 or 5'. The main part 5a of the driven roller 5 or 5' is contained in the long hole 7c between the roller bearings 7a and 7b, and is exposed from the underside of the guiding plate 7.

The driven rollers 5, 5' comprise a cylindrical main part 5a and short axes 5b provided at the two ends of the cylindrical main part 5a. The cylindrical main parts 5a and short axes 5b of the driven rollers 5, 5' can adopt a whole piece made of synthetic resin. The full length of the driven rollers 5, 5' is not longer than half the full length of the carrying roller 4, and the full length of the carrying roller 4 is set a little longer than the diameter of the optical disk D.

In the present embodiment, the external diameter of the cylindrical main parts 5a of the driven rollers 5, 5' is 1.9 mm, and the full length of the main parts 5a is set as 46 mm, and the diameter of the short axes 5b at the two ends of the main parts 5a is 0.7 mm. The roller bearings 7a are axis holes, and the roller bearings 7b are U shape grooves. As fixing, the short axis 5b of one end of the driven rollers 5, 5' is inserted into the axis hole, and the short axis 5b of the other end of the driven rollers 5, 5' is pressed into the U shape groove; then, the four claws 7e of the guiding plate 7 are embedded into the corresponding claw holes 6a on the cover 6; so, the driven rollers 5, 5' are held between the optical disk guiding part 11 and the cover 6, and are able to rotate around the short axis 5b.

FIG. 3 illustrates the state of the optical disk D being held between the carrying roller 4 and the driven rollers 5, 5' with the action of the two springs 10. At this moment, the outer margin of the lower surface (namely the front surface) of the optical disk D contacts the conical surface of the carrying roller 4. On the other hand, the outer margin of the upper surface (namely the back surface) of the optical disk D contacts the external circumference of the main parts 5a of the driven rollers 5, 5' exposing from the underside of the optical disk guiding part 11. So, by the clockwise rotating of the carrying roller 4, the optical disk D is sent to the right in the figure; contrarily, by the counterclockwise rotating of the carrying roller 4, the optical disk D is sent to left in the figure. That is, it is able to transport the optical disk from the insertion inlet to the optical disk plummer, and transport the optical disk from the optical disk plummer to the insertion inlet. During the process of transporting, the external circumference of the main parts 5a of the driven rollers 5, 5' contacts the outer margin of the upper surface of the optical disk D, so as to rotate towards the direction opposite to the rotating direction of the carrying roller 4. So, via the rotating of the driven rollers 5, 5', the upper surface of the optical disk D can be protected from being scratched. On the other hand, only the outer margin of the upper surface of the optical disk D contacts the external circumference of the driven rollers 5, 5', and also only the outer margin of the lower surface of the optical disk D contacts the pyramids 4a, 4b of the carrying roller 4, so it further more ensures that during the process of transporting optical disks both the front and back surfaces of the optical disk D would not be scratched.

FIG. 4 and FIG. 5 are structure schematic diagrams of an optical disk playing device fixed with above mentioned optical disk transport device. As shown in the figures, an insertion inlet 2 is provided at the front of the casing 1, and a plummer 3 to rotate the optical disk is provided at the middle position. The optical disk guiding part 11 and carrying roller 4 of the above mentioned optical disk transport device are provided between the insertion inlet 2 and the plummer 3; the optical disk guiding part 11 is fixed at the lower side of the cover 6; the carrying roller 4 is fixed to a support plate 17 to be able to rotate freely; one end of the carrying roller 4 is provided with a gear 4c for gearing the motor power; said two springs 10 is provided between the support plate 17 and the chassis 9 supporting the plummer 3. When the optical disk D is not inserted to the insertion inlet 2, the carrying roller 4 with the action of the springs 10 is pushed into the groove 7d (that is, the position of dashed line in FIG. 3) of the optical disk guiding part 11; when the optical disk D is inserted to the insertion inlet 2, the optical disk guiding part 11 makes the optical disk D to be inserted between the driven rollers 5, 5' and the carrying roller 4, and the carrying roller 4 with the action of the elastic force of the springs 10 holds the optical disk D between the carrying roller 4 and the driven rollers 5, 5'.

The cover 6 shown in FIG. 4 is also provided with: a detecting bar 12 to detect the optical disk D after the optical disk D is inserted into the insertion inlet 2; a switch 13 to implement controlling starting the motor M according to the state of the detecting bar 12; a retaining clip mechanism 14 to keep the optical disk at the plummer 3; an optical disk guiding mechanism 15 to align the center of the optical disk D with the center of the plummer 3 according to the external diameter of the optical disk D being inserted; a trigger mechanism 16 to make the carrying roller 4 move from the optical disk guiding part 11 via changing the position of the support plate 17 after the centers of the optical disk D and the plummer 3 are aligned. The retaining clip mechanism 14 is provided with four support bars 14a. When the optical disk D is not loaded to the plummer 3, the support bars 14a keep the retaining clip with built-in magnet (this part is not shown in the figures) at the upper side of the plummer 3. If the optical disk D is loaded to the plummer 3, the support bars 14a cancel the state for keeping the retaining clip.

FIG. 5 is a schematic diagram of observing the playing device from the side of the insertion inlet 2. As it is seen, the ends adjacent to the middle of the carrying roller 4 of every driven roller 5, 5' all slant upwards.

In the present embodiment, inclined driven rollers 5, 5' being capable of contacting the external circumference of the optical disk D and rotating freely are provided along the two sides of the rotating axis 4d of the carrying roller 4, at the positions on the optical disk guiding part 11 opposite to the carrying roller 4, opposite to the two pyramids 4a, 4b of the carrying roller 4. The axis length of the driven rollers 5, 5' is less than half the axis length of the carrying roller 4, so as to increase the enduring ability to the elasticity of the springs 10. And the spring force is endured by four driven rollers to disperse the elastic force, so the axis diameter of the driven rollers can be made much smaller to implement the miniaturization of the playing device. Besides, if the driven rollers are made of synthetic resin, the cost can be further reduced. Especially the surface of the optical disk can effectively be protected from being scratched.

In the present embodiment, the driven rollers 5, 5' is made of synthetic resin, but not being limited by this, and it can also be made of metal materials. In the present invention, the quantity of the driven rollers is not limited only as four, and according to the requirements it can be two, four, six or even more. When the quantity of the driven rollers is two, the positions on the optical disk guiding part opposite to the two pyramids of the carrying roller are separately provided with a driven roller. And the rotating axes of the two driven rollers are both preferably parallel to the plane 8 and the rotating axis 4d of the carrying roller is vertically spaced from the cover 6 of the optical disk playing device. And the ends adjacent to the middle of the carrying roller of each driven roller slant upwards, so as to make the driven rollers only contact the outer margin of the optical disk when the optical disk is inserted. When the quantity of the driven rollers is six, the positions on the optical disk guiding part opposite to the two pyramids of the carrying roller are separately provided with three driven rollers parallel to each other. And the rotating axes of each driven roller are parallel to the plane 8 and the rotating axis 4d of the carrying roller is vertically spaced from the cover 6 of the optical disk playing device. The optical disk guiding part 11 can also be made as one piece to fix all the driven rollers to it.

The optical disk transport device of the present invention is especially suitable for the optical disk playing device using optical disks which have both surfaces being recording surfaces. For the optical disk with one side being a label surface, it can also protect the label, so it can also be used as an ordinary playing device for single surface optical disk.

What is claimed is:

1. An optical disk transport device for an optical disk player comprising:
   an optical disk guiding part;
   a carrying roller being located below the optical disk guiding part, its roll body being a bipyramidal structure formed by two pyramids of the carrying roller, and the bipyramidal structure with the diameter gradually decreasing from the two ends to the middle;
   two groups of driven rollers being rotationally fixed to the optical disk guiding part and separately corresponding to the two pyramids of the carrying roller, the rotating axis of each group of driven rollers being located parallel to the rotating axis of the carrying roller which is vertically spaced from the cover of the optical disk playing device, the ends adjacent to the middle of the carrying roller of each driven roller slanting upwards, so as to make the driven rollers only contact the outer margin of the optical disk when the optical disk is inserted;
   an elastic part for pressing the carrying roller towards the optical disk guiding part; and
   a motor for driving the carrying roller to rotate.

2. The optical disk transport device of claim 1, wherein each driven roller comprises a cylindrical main part and short axes provided at the two ends of the cylindrical main part.

3. The optical disk transport device of claim 2, wherein the cylindrical main part and short axes at the two ends of the main part can be a whole piece made of synthetic resin.

4. The optical disk transport device of claim 2, wherein the external diameter of the cylindrical main parts of the driven rollers is 1.9 mm, and the diameter of the short axes at the two ends of the main parts is 0.7 mm.

5. The optical disk transport device of claim 1, wherein each group of the driven rollers comprises two driven rollers, and the rotating axes of the two driven rollers are parallel to each other and are distributed at the two sides of the rotating axis of the carrying roller which is vertically spaced from the cover of the optical disk playing device, and the rotating axes of the two driven rollers are also parallel to the rotating axis of the carrying roller.

6. The optical disk transport device of claim 5, wherein each driven roller comprises a cylindrical main part and short axes provided at the two ends of the cylindrical main part.

7. The optical disk transport device of claim 6, wherein the cylindrical main part and short axes at the two ends of the main part can be a whole piece made of synthetic resin.

8. The optical disk transport device of claim 6, wherein the external diameter of the cylindrical main parts of the driven rollers is 1.9 mm, and the diameter of the short axes at the two ends of the main parts is 0.7 mm.

9. The optical disk transport device of claim 5, wherein the optical disk guiding part comprises two guiding plates, and the two guiding plates are fixed below the cover of the optical disk playing device and are separately corresponding to the two pyramids of the carrying roller; the middle of each guiding plate is provided with a groove to contain the pyramid of the carrying roller, and the two sides of the guiding plates slant towards the direction of the cover to form an optical disk guiding surface.

10. The optical disk transport device of claim 9, wherein each driven roller comprises a cylindrical main part and short axes provided at the two ends of the cylindrical main part.

11. The optical disk transport device of claim 10, wherein the cylindrical main part and short axes at the two ends of the main part can be a whole piece made of synthetic resin.

12. The optical disk transport device of claim 10, wherein the external diameter of the cylindrical main parts of the driven rollers is 1.9 mm, and the diameter of the short axes at the two ends of the main parts is 0.7 mm.

13. The optical disk transport device of claim 9, wherein two pairs of roller bearings are provided on each guiding plate, and a long hole is provided between each pair of roller bearings; each pair of roller bearings support a driven roller; the main part of the driven roller is contained in the long hole between the roller bearings, and is exposed from the underside of the guiding plate.

14. The optical disk transport device of claim 13, wherein each driven roller comprises a cylindrical main part and short axes provided at the two ends of the cylindrical main part.

15. The optical disk transport device of claim 14, wherein the cylindrical main part and short axes at the two ends of the main part can be a whole piece made of synthetic resin.

16. The optical disk transport device of claim 9, wherein the optical disk guiding surface on the guiding plate may be a circular-arc guiding surface or an inclined plane.

17. The optical disk transport device of claim 16, wherein each driven roller comprises a cylindrical main part and short axes provided at the two ends of the cylindrical main part.

18. The optical disk transport device of claim 17, wherein the external diameter of the cylindrical main parts of the driven rollers is 1.9 mm, and the diameter of the short axes at the two ends of the main parts is 0.7 mm.

19. The optical disk transport device of claim 9, wherein two pairs of roller bearings are provided on each guiding plate, and a long hole is provided between each pair of roller bearings; each pair of roller bearings support a driven roller; the main part of the driven roller is contained in the long hole between the roller bearings, and is exposed from the underside of the guiding plate; and the optical disk guiding surface on the guiding plate may be a circular-arc guiding surface or an inclined plane.

20. The optical disk transport device of claim 19, wherein each driven roller comprises a cylindrical main part and short axes provided at the two ends of the cylindrical main part, the external diameter of the cylindrical main parts of the driven rollers is 1.9 mm, and the diameter of the short axes at the two ends of the main parts is 0.7 mm.

\* \* \* \* \*